United States Patent
Kurishita et al.

(10) Patent No.: US 7,100,198 B2
(45) Date of Patent: Aug. 29, 2006

(54) PRINTING METHOD, PRINT SYSTEM AND PROGRAM

(75) Inventors: Yoshio Kurishita, Yokohama (JP); Katsuhiro Toyofuku, Machida (JP)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 10/215,106

(22) Filed: Aug. 8, 2002

(65) Prior Publication Data

US 2003/0041269 A1 Feb. 27, 2003

(30) Foreign Application Priority Data

Aug. 10, 2001 (JP) ............... 2001-243449

(51) Int. Cl.
*H04L 9/32* (2006.01)
*G06F 7/04* (2006.01)

(52) U.S. Cl. .................... 726/4; 358/1.13; 380/51

(58) Field of Classification Search ................ 380/51
See application file for complete search history.

(56) References Cited

U.S. PATENT DOCUMENTS

| | | | |
|---|---|---|---|
| 6,801,935 B1 * | 10/2004 | Shen | 709/219 |
| 6,874,034 B1 * | 3/2005 | Hertling | 709/245 |
| 6,894,793 B1 * | 5/2005 | Roosen et al. | 358/1.15 |
| 2001/0038462 A1 * | 11/2001 | Teeuwen et al. | 358/1.15 |

* cited by examiner

*Primary Examiner*—Christopher Revak
*Assistant Examiner*—Brandon Hoffman
(74) *Attorney, Agent, or Firm*—Dillon & Yudell, L.L.P.; Dale M. Crockatt (57) ABSTRACT

In a printer system in which a plurality of virtual printers can be set, virtual printer names are properly used to select ordinary printing and security printing whose contents should be kept confidential. When print data whose contents should be kept confidential is printed, a virtual printer name for security printing, e.g., "sp2351", is set upon directing printing. A printer identifies the virtual printer name for security printing by a part "sp", and temporarily stores the contents to be printed in a memory. Subsequently, when the user inputs "2351" directly to the printer, printing is done.

5 Claims, 5 Drawing Sheets

PRINTING METHOD, PRINT SYSTEM AND PROGRAM

FIELD OF THE INVENTION

The present invention relates to a printing method, a print system and a program which employ a printer connected to a network. More particularly, it relates to techniques according to which a user having issued a print request can reliably obtain printouts while observing secrecy.

BACKGROUND ART

Usually, a printer connected to a network is shared by a plurality of user terminals. In this environment, the situation might occur that the printed matter of a user is seen by another user, or that the printed matter is erroneously taken away by another user. Such a situation is problematic in case of printing which is to be done with security afforded, for example, printing of secret or private information that ought not to be seen by any other user.

As a method for solving the above problem, the following has been known: First, a printer driver which can transmit a password to a printer simultaneously with the transmission of print data is prepared on the side of the user's computer system. Besides, the printer or printer server is furnished with means for identifying the password transmitted from the user's computer. Also, the password is registered on the side of the printer or printer server beforehand. In the case where the user prints the information not desired to be seen by another user, he/she transmits the print data and the password from his/her own computer to the printer. In the printer, the password is collated with a group of passwords registered beforehand, so as to confirm the user. Herein, the print data is not immediately printed, but it is once stored in a memory. The user goes to a place where the printer is installed, and inputs his/her password directly to the printer. In response to the input of the password, the printer prints the print data stored in the memory. In this way, the user can reliably obtain printed matter which is desired to be kept confidential, and he/she can avoid the problem that the contents of the printed matter are seen by another user. Such methods are described in, for example, Japanese Patent Publication Nos. H8-39898, H8-83153 and H9-65148.

The above conventional printing method which is implemented with security afforded, has a problem that the dedicated printer driver is required to handle the extra information or password, and it would take time and cost to install it. Besides, the conventional printing method has another problem that individual registration of passwords in the printer is required, which would complicate a setting procedure at a stage prior to printing. By way of example, when a portable personal computer carried into an office from outside is connected to a network to direct a print operation from the portable personal computer, the above printing method requires a troublesome procedure to set a password in the printer beforehand.

SUMMARY OF THE INVENTION

A purpose of the present invention is to provide a method for allowing a user to keep print information confidential at a lower cost and more conveniently. Another object of the present invention is to provide a system for implementing the method. Still another purpose of the present invention is to provide a program for implementing the method.

The present invention will be schematically described next. A user properly uses a plurality of virtual printer names to suitably select either an ordinary printing mode in which printing is automatically done by a printer, or a security printing mode in which printing is done by specifying a virtual printer name to the printer. Thus, the user can perform the printing in a state where print information is kept confidential, without requiring any special software.

The present invention provides a printing method comprising the steps of receiving a print instruction which contains a virtual printer name, judging if the virtual printer name is a virtual printer name for security printing, and storing print data without executing the printing if the judgment is true. The method may further comprise the steps of accepting inputting of the virtual printer name for security printing to a printer, and printing the print data in response to the inputting. The method may further comprise the step of printing the print data without inputting a printer name to a printer if the judgment is false.

The present invention utilizes software by which a plurality of virtual printers are set for a single printer so that a plurality of users can handle the virtual printers as if these printers are individual printers dedicated to the respective users. According to the present invention, even when the printer is shared by a plurality of users, a virtual printer having a specific name is employed as a virtual printer for security printing, whereby the printing by the specific virtual printer is not immediately done, so as to avoid the situation that printed contents are known to another user or that printed matter is taken away by another user. According to the present invention, the type of printing is judged from the virtual printer name, and hence, there is no need to handle extra information or password, so that the invention can be implemented by employing commercially available software. Besides, it is unnecessary to register users on a printer side or printer server side beforehand.

The "virtual printer" (also termed "logical printer") signifies a printer function which is virtually set in the printer. With the virtual printers, for example, it is possible to set up virtual printers A and B having different print setting conditions in a single printer, so that they are suitably selected from a user terminal in accordance with printing conditions, whereby the two printers are properly used in spite of the single printer. The virtual printers may be used on a network by utilizing, for example, an LPR (Line Printer Remote) function that is a utility for sharing a printer on a TCP/IP network.

"Ordinary printing" signifies a normal print process in which printing is done by the printer after a print instruction has been sent to the printer from the computer. "Security printing" signifies a print process which solves the problem that the printed matter output from the printer is seen or taken away by a third party. By way of example, the security printing is such a print process in which the printing is not done merely by the print command from the user terminal, but the printing is done and the user can directly obtain the printed matter when the user goes to the front of the printer and enters a password therein. The present invention may also be grasped as a system or a program.

PREFERRED EMBODIMENTS OF THE INVENTION

The preferred embodiments of the present invention will now be described in detail with reference to the drawings. The present invention, however, can be carried out in many different ways and the embodiments should not be construed to limit the present invention. Throughout the embodiments, the same reference numerals shall be assigned to the same elements, respectively.

Figure 1:
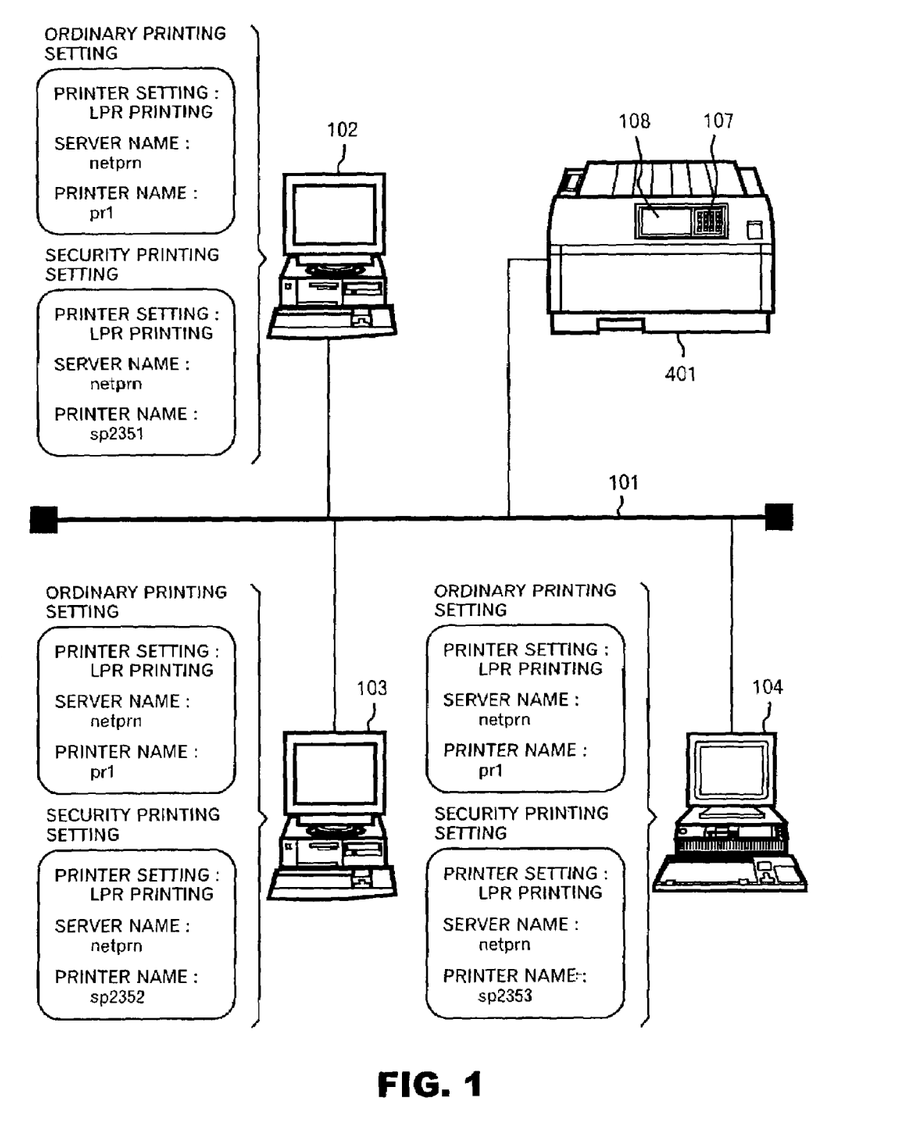
FIG. 1 is a conceptual diagram showing an example of a network which can implement a printing method according to an embodiment of the present invention.
Figure 2:
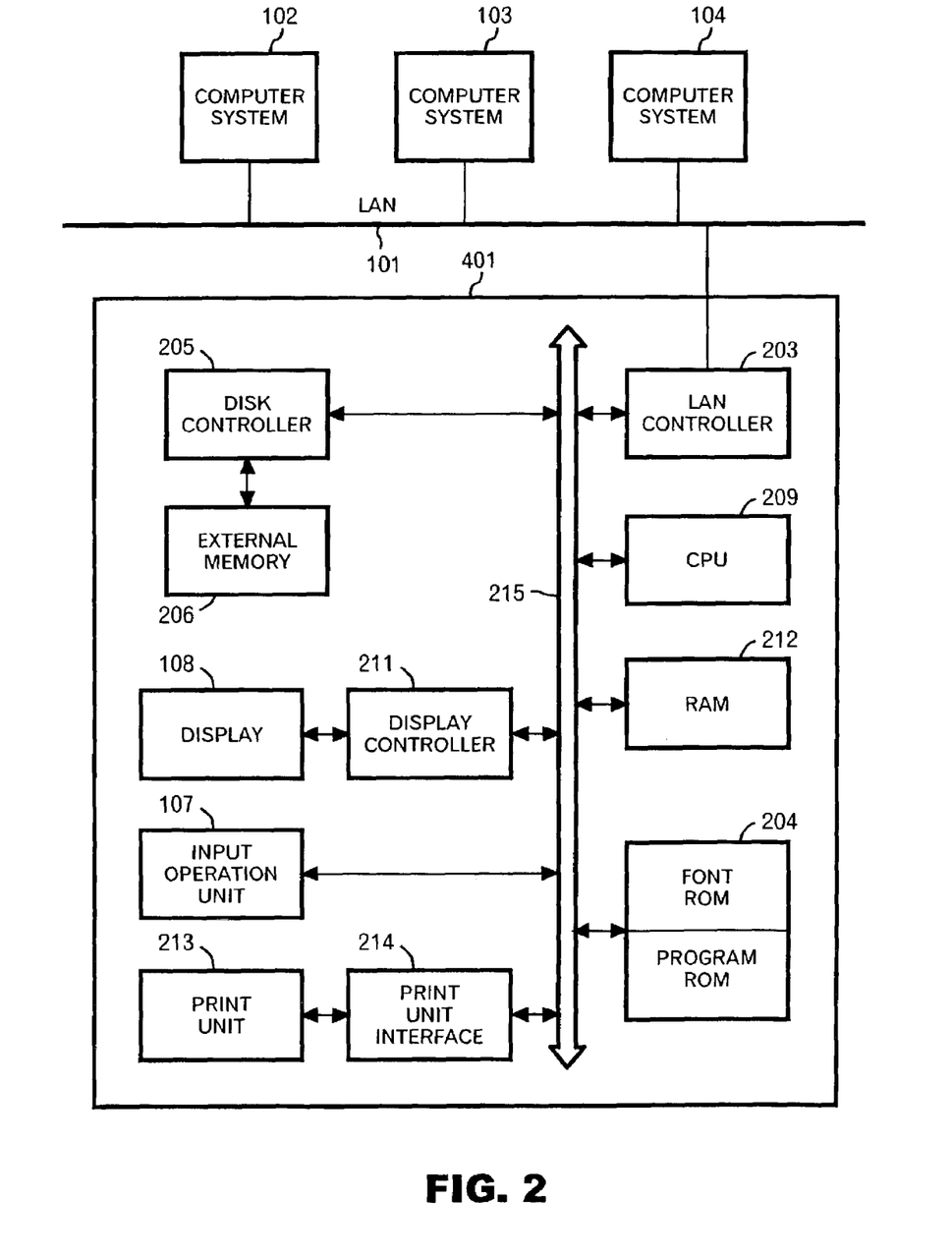
FIG. 2 is a functional block diagram illustrating the functions of a printer section in detail, in the network shown in FIG. 1.

A first embodiment to be described is an example in which the present invention is implemented by using a printer having a printer server function (usually called "network printer"). FIG. 1 is a diagram showing an example of a network which can implement a printing method according to the embodiment of the present invention. FIG. 2 is a functional block diagram illustrating particularly the functions of a printer section in detail, in the network of FIG. 1.

A plurality of computer systems 102, 103 and 104 are connected to a LAN (Local Area Network) 101 which uses a known protocol such as TCP/IP. Further, a printer 401 is connected to the LAN 101.

Each of the computer systems 102, 103 and 104 has the same basic functions as in a conventional personal computer. Also, it includes a printer driver which is capable of LPR printing. The LPR is a kind of protocol for sharing a printer in a TCP/IP network, and is generally used in a UNIX environment. The LPR function is offered, for example, in Windows 2000, which may be utilized to provide LPR and LPD services each of which is independently operated in a Windows 2000 print server. The LPD service is a service at a reception side for print data transmitted using the LPR service. ("UNIX" is a registered trademark of The Open Group in the United States and other countries, and "Windows" is a trademark of Microsoft Corporation in the United States, other countries, or both.)

The printer 401 having the printer server function includes a LAN controller 203 which serves to connect this printer to the LAN 101 employing the TCP/IP protocol, an external memory 206 which is constituted of a hard disk drive, a disk controller 205 which controls the external memory 206, a CPU 209 which controls individual devices, and a RAM 212 which temporarily stores print and other data. Also, the printer 401 includes an input operation unit 107 which serves to input a virtual printer name in the security printing and to perform operations necessary in printing, a display 108 which displays necessary information in association with the input operation unit 107, a display controller 211 which controls the display 108, a ROM 204 in which various data, and a program for controlling the operation of the printer 401 are stored, a print unit interface 214 which sends a print unit 213 image information based on the print data, and a system bus 215 which interconnects the individual devices. Further, a driver for implementing the above LPD service is installed in the printer 401.

The ROM 204 includes a font ROM and a program ROM. Data concerning the fonts of characters to be printed are stored in the font ROM, while the control program for the CPU 201 illustrated in the flowchart of FIG. 3 described later is stored in the program ROM.

An example of a printing job in this embodiment will be described next. In this embodiment, a user sets, for example, "netprn" as a server name of the printer 401. Also, the user sets a virtual printer name beginning with, for example, "pr", as a virtual printer name for use in the ordinary printing. Likewise, the user sets a virtual printer name beginning with, for example, "sp", as a virtual printer name for use in the security printing. That is, "pr" is a code part for designating the ordinary printing, while "sp" functions as a code part for designating the security printing. These codes and their roles are previously determined, and are stored in the RAM 212 or the external memory 206 beforehand. Additionally, the user inputs the printer server name, the virtual printer name for the security printing and the virtual printer name for the ordinary printing in a print setting screen (screen for setting printing conditions, etc.) of the corresponding one of the computer systems 102, 103 and 104, to thereby set them beforehand so that they can be selected on the screen at the time of print processing. It is needless to say that other codes may be utilized instead of "netprn", "pr" and "sp". (Of course, the roles of the respective codes need to be previously determined.)

When a print instruction is issued from the computer system 102, 103 or 104, the CPU 209 in the printer 401 recognizes a virtual printer name contained in the print instruction on the LAN protocol and collates it with the virtual printer name stored in the RAM 212 or external memory 206. In the collation, it is judged whether the designated virtual printer name is the one for security printing. By way of example, if the virtual printer name beginning with "pr" has been designated, the CPU 209 recognizes the ordinary printing, that is, it judges that the virtual printer for security printing is not specified, and the printing is immediately done by the print unit 213. On the other hand, if the virtual printer name beginning with "sp" has been designated, the CPU 209 recognizes the security printing, and print data is stored in the RAM 212 or external memory 206 without printing by the print unit 213.

The printer 401 is set so as to perform the security printing when the four hinder digits of the virtual printer name for security printing have been inputted through the input operation unit 107. More specifically, the four hinder digits of the virtual printer name for security printing are stored in the RAM 212 or external memory 206. When specific digits have been inputted through the input operation unit 107, the CPU 209 collates the inputted contents with the stored four digits so as to judge whether the printing is to be done. Any special printer driver need not be installed in each computer system.

Figure 3:
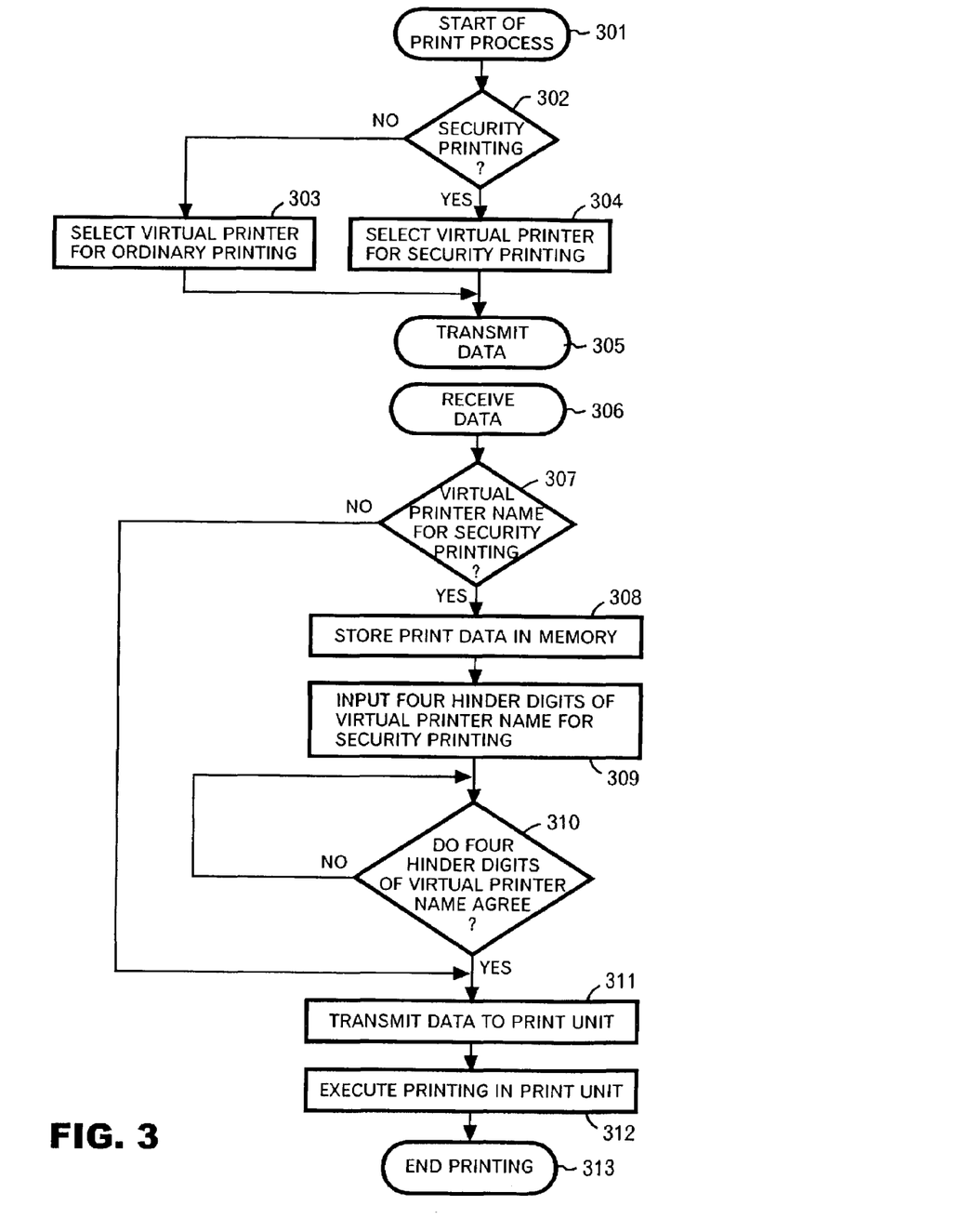
FIG. 3 is a flowchart showing an example of a printing operation in an embodiment.

FIG. 3 is a flowchart showing an example of a printing operation in this embodiment. The embodiment will be described below in which printing is to be done from the computer system 102. In FIG. 3, steps 301–305 are processing steps in the computer system 102, and steps 306–313 are processing steps in the printer 401.

First, the user sets and registers server and virtual printer names in the print setting screen. It is assumed here that the user sets and registers "netprn" as a server name, "sp2351" as a virtual printer name for security printing, and "pr1" as a virtual printer name for ordinary printing.

When the user starts the print process (step 301), he/she first determines a type of printing. That is, the user selects if the printing is the security printing (step 302). If the printing to be done is the security printing, the user selects "netprn" as a server name (printer server name) and "sp2351" as a printer name (virtual printer name) on the print setting screen (step 304). Here, "sp" is a code for designating the security printing. "2351" is a code for identifying a virtual printer for the security printing. The code "2351" is exemplary and may well be replaced with a different code.

In case of the ordinary printing, the user selects "netprn" as a server name (printer server name) and "pr1" as a printer name (virtual printer name) on the print setting screen (step 303). Here, "pr" is a code for designating the ordinary printing. "1" is a code for designating one of virtual printers for the ordinary printing. Since a plurality of virtual printers can be set, identifying codes such as "pr1" and "pr2" are also assigned to the virtual printers for ordinary printing. The virtual printers for ordinary printing may be further increased by assigning "pr2", "pr3" and so on. A plurality of virtual printers for ordinary printing may be set when the virtual printers are to be properly used in accordance with different printing conditions.

The user may also set other printing conditions such as format etc., not shown. Subsequently, a print instruction is transmitted from the computer system 102 to the printer server 401 (step 305). The transmission is done using the LPR protocol. The print instruction contains print data, IP address of the computer system 102, user name, various setting information items, and IP address and virtual printer name of the destination printer 401.

The printer 401 receives the print instruction transmitted from the computer system 102, via the LAN 101 (step 306), and the CPU 209 recognizes the virtual printer name contained in the print instruction on the LAN protocol. Subsequently, the CPU 209 judges if the recognized virtual printer name is a virtual printer name for security printing (step 307). This judgment is done in the CPU 209 by referring to judging conditions stored in the RAM 212 or external memory 206. The security printing is judged when the virtual printer name is "sp****", while the ordinary printing is judged when the virtual printer name is "pr*", wherein "*" is a symbol representing any desired numeric character.

When the security printing is judged in step 307, the print data and associated information are temporarily stored in the external memory 206 or RAM 212 (step 308). At this time, the print data is not printed, and the print data and associated information are merely stored. Also, in the printer 401, the IP address of the computer system 102 and user name are recognized when the print instruction is received (step 306). The IP address and user name are stored in the external memory 206 or RAM 212 in association with the print data.

When the printing is judged as not being the security printing (as being the ordinary printing) in step 307, the print data and associated information are sent to the print unit interface 214, from which they are further transmitted to the print unit 213 (step 311). Subsequently, the print data is printed in the print unit 213 (step 312). Thus, the print process is ended (step 313). The printing in the ordinary printing mode proceeds in just the same manner as the conventional printing. That is, the printing in the ordinary printing mode is done without directly inputting the virtual printer name to the printer 401. By the way, if an improper name has been inputted as the virtual printer name, the printer 401 does not recognize the designated virtual printer either as the virtual printer for ordinary printing or as the virtual printer for security printing, in step 307, resulting in a print error, and the printing operation is stopped.

If the printing is judged as the security printing in step 307 and the user of the computer system 102 (the user intending to execute the security printing) obtains printed matter, the print process proceeds as follows. First, the user goes to the front of the printer 401, and operates the input operation unit 107 so that the names of users who have directed the security printing, stored in the RAM 212 or external memory 206, are displayed on the display 108. By way of example, if the computer system 103 has also directed the security printing at that time, the user names of the computer systems 102 and 103 are displayed on the display 108. Subsequently, the user operates the input operation unit 107 so as to select his/her own user name from among the user names displayed on the display 108. Further, the user inputs the four hinder digits "2351" of the virtual printer name for security printing as selected in step 304, through the input operation unit 107 (step 309).

In the printer 401, the virtual printer name for security printing "sp2351" is searched for from the stored information of the external memory 206 or RAM 212, on the basis of the user name selected through the input operation unit 107. The virtual printer name for security printing "sp2351" searched for is compared with the code "2351" inputted through the input operation unit 107, so as to judge if the four hinder digits agree (step 310).

If the judgment in step 310 is true, the corresponding print data and associated information temporarily stored in step 308 are transmitted to the print unit 213 through the print unit interface 214 (step 311). Subsequently, the printing is executed in the print unit 213 (step 312). The print data stored is deleted after completion of the printing, and the printing operation is ended (step 313).

In this way, the user wanting to execute the security printing can directly obtain the printed matter by directly operating the printer 401. In the above security printing, printing is not immediately executed even when the printing instruction is given from the computer system, and it is not done unless the user goes to the front of the printer 401 and directly operates the input operation unit 107. Accordingly, the user can avoid the situation that the printed contents are seen by another user sharing the printer 401, or that the printed matter is taken away. Moreover, the user can avoid the situation that any other user executes printing, by keeping the virtual printer name for security printing secret from other users.

In this embodiment, any special printer driver need not be installed. Also, this embodiment does not require any user registration in the printer. In this embodiment, accordingly, an inexpensive and convenient security printing system can be installed. Moreover, in this embodiment, the setting for the security printing can be easily changed. Therefore, the security printing can be readily performed, for example, by connecting a personal computer system newly incorporated to the network.

While the exemplary printing by the computer system 102 has been described, similar printing may be done by the computer system 103 as follows. First, the ordinary printing proceeds in the same manner as in the case of the computer system 102. For the security printing, a print instruction is given by setting a printer name as, for example, "sp2352". In the printer 401, the part "sp" is identified to judge that the printing is the security printing. The user of the computer system 103 operates the input operation unit 107 of the printer 401 so as to select his/her own user name among the user names displayed on the display 108, and further inputs "2352" to cause the printer 401 to execute the printing and obtain printed matter.

In the example shown above, the part "sp" is fixed as regards a virtual printer name for security printing. However, the four digits following the part "sp" can be freely selected. The four digits may be previously determined for each user, or they may be freely set at each time printing is done. Also, the user may be permitted to input alphabetic characters from the input operation unit 107 so that an alphabetic printer name such as "spABCD" is assigned. Further, the user may input the full virtual printer name for security printing at step 309. In this case, the virtual printer name for security printing is identified by the four hinder digits. Also, the printer 401 may execute the printing in such a way that only the virtual printer name for security printing is inputted through the input operation unit 107 of the printer 401 without designating the user name. Moreover, the number of digits or characters for the security printing need not be limited to four, but any desired number can be adopted.

Figure 4:
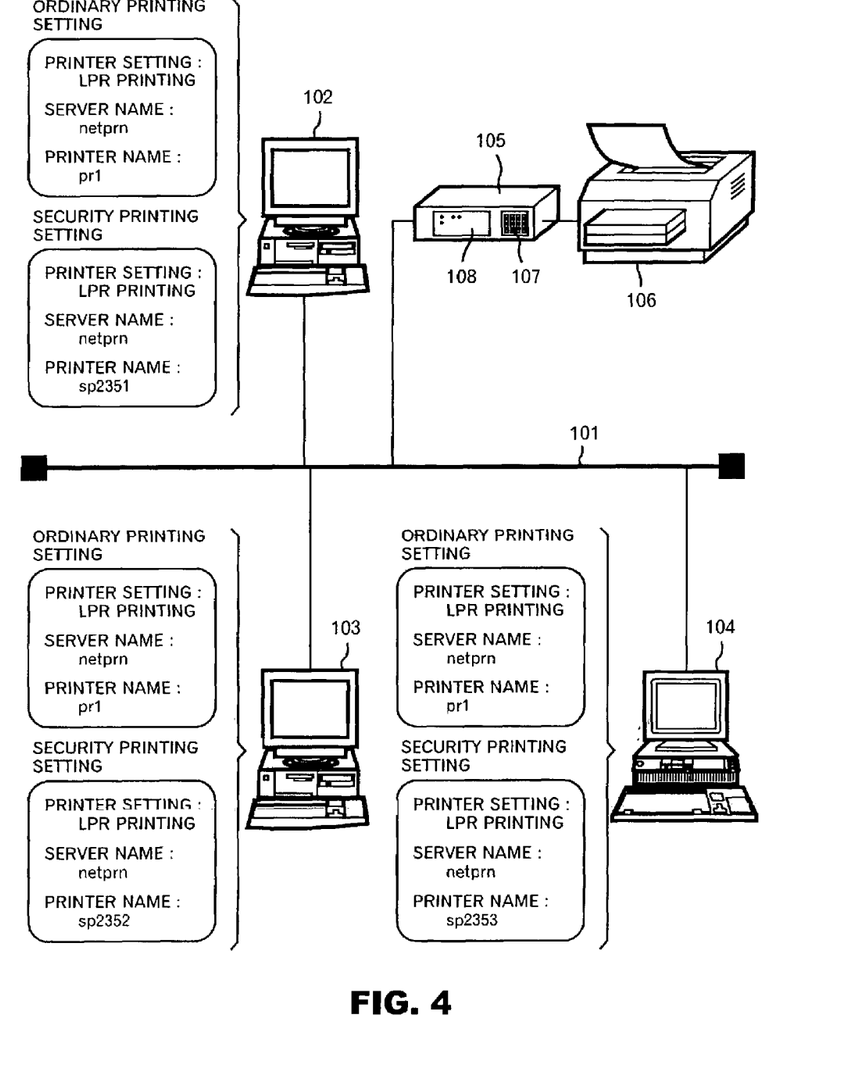
FIG. 4 is a diagram showing an example of a network which can implement a printing method according to another embodiment of the present invention.
Figure 5:
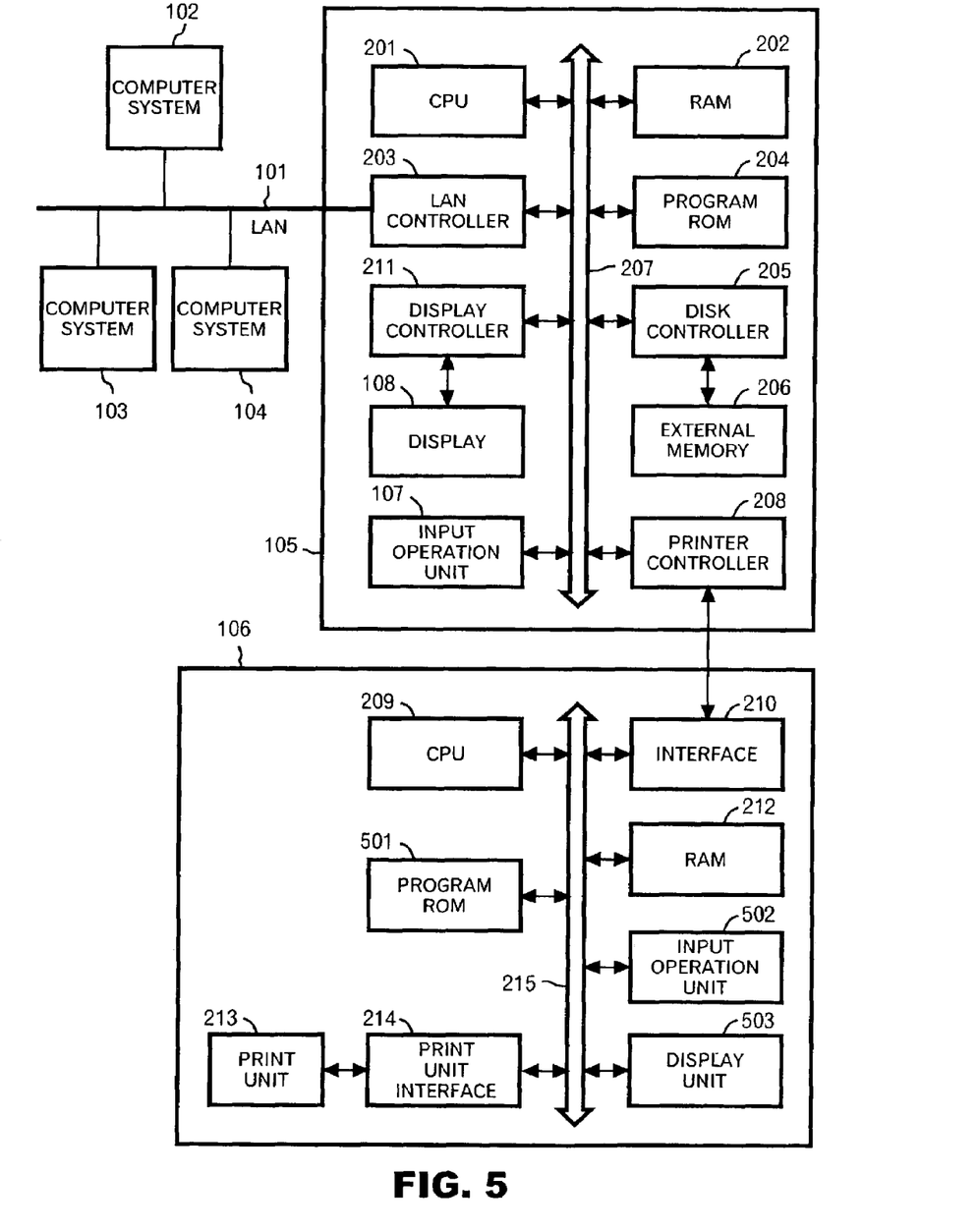
FIG. 5 is a functional block diagram illustrating the functions of printer server and printer sections in detail, in the network shown in FIG. 4.

In an alternate embodiment, a printer server for controlling the operation of a printer is used, and a virtual printer name for security printing is inputted to the printer server to thereby perform the security printing. FIG. 4 is a conceptual diagram showing an example of a network which can implement a printing method according to the embodiment of the present invention. FIG. 5 is a functional block diagram illustrating the functions of printer server and printer sections in detail, in the network shown in FIG. 4.

A plurality of computer systems 102, 103 and 104 are connected to a LAN (Local Area Network) 101 which employs a known protocol, for example, TCP/IP. A printer server 105 is also connected to the LAN 101. The printer server 105 is placed near a printer 106, and is connected to the printer 106 by a printer parallel cable. In this embodiment, the security printing is executed by directly operating the printer server 105. In this embodiment, the computer systems 102, 103 and 104 function as client systems with respect to the printer server 105. The printer server 105 performs print control for the printer 106 in response to a print request from any of the computer systems 102, 103 and 104 which are clients.

Each of the computer systems 102, 103 and 104 has the same basic functions as those of conventional personal computers, and further includes a printer driver which is capable of LPR printing.

The printer server 105 generally has a hardware configuration specialized to server functions, and often has a size equal to or smaller than B5. A driver which can implement the above LPD service is installed in the printer server 105. The printer server 105 illustrated in FIG. 5 includes a CPU 201 which controls the functions of the whole printer server 105, a RAM (Random Access Memory) 202 in which print data and other requisite data are temporarily stored, and a LAN controller 203 which receives data transmitted over the LAN 101 into the printer server 105, and serves to access to other devices on the LAN 101. Also, the printer server 105 includes a ROM (Read Only Memory) 204 in which a program for controlling the operation of the printer server 105 is stored, an external memory 206 which is constituted by, for example, a hard disk drive, a disk controller 205 which controls the external memory 206, and a printer controller 208 which executes a communication control process between it and the printer 106 through the printer parallel cable. In addition, the printer server 105 includes an input operation unit 107 through which a virtual printer name for security printing and necessary information are inputted, a display 108 which provides various presentations, a display controller 211 which controls the display 108, and a system bus 207 which interconnects the individual devices. The input operation unit 107 has a ten-key input function, and a function of selecting a particular one of contents displayed on the display 108.

Stored in the ROM 204 is the control program of the CPU 201 as illustrated in the flowchart of FIG. 3.

The printer 106 includes a CPU 209 which controls individual devices generally, an interface 210 which serves to communicate with the printer server 105, a RAM 212 which temporarily stores print data, etc., a print unit interface 214 which sends image information based on the print data, to a print unit 213, a program ROM 501 in which a program for controlling the operation of the printer 106 is stored, an input operation unit 502 through which resetting, test printing, etc., can be directed, a display unit 503 which displays an error message etc., and a system bus 215 which interconnects the individual devices.

The printer server 105 controls the printing operation of the printer 106. When a virtual printer name for security printing is inputted through the input operation unit 107, the printer server 105 sends corresponding print data to the printer 106 and causes the printer 106 to perform the printing.

An example of a printing job in this embodiment will be described below. First, a user sets a virtual printer name. The virtual printer name may be the same as in Embodiment 1. That is, the user sets, for example, "netprn" as the name of the printer server 105. Further, the user sets a virtual printer name beginning with, for example, "pr", as a virtual printer name for ordinary printing, and a virtual printer name beginning with, for example, "sp", as a virtual printer name for security printing. These codes and their roles are previously determined, and the data thereof are stored in the RAM 202 or external memory 206 beforehand. Also, the user inputs the printer server name, the virtual printer name for security printing and the virtual printer name for ordinary printing in the print setting screen (screen for setting printing conditions etc.) of the computer system 102, 103 or 104 so that they can be selected on the screen.

When a print instruction is issued from the computer system 102, 103 or 104, the CPU 201 in the printer server 105 recognizes a virtual printer name contained in the print instruction and collates it with the virtual printer name stored in the external memory 206. In the collation, it is judged if the designated virtual printer name specifies a printer for security printing. By way of example, if the virtual printer name beginning with "pr" has been designated, the CPU 201 recognizes the ordinary printing, that is, it judges that the virtual printer for security printing is not specified, and the printing is immediately done by the printer 106. On the other hand; if the virtual printer name beginning with "sp" has been designated, the CPU 201 recognizes the security printing, and the print data is stored in the RAM 202 or external memory 206 without printing it by the printer 106.

The printer server 105 is set up so as to execute the security printing when the four hinder digits of the virtual printer name for security printing is inputted through the input operation unit 107. That is, the four hinder digits of the virtual printer name for security printing are stored in the RAM 202 or external memory 206, and when particular digits are inputted through the input operation unit 107, the CPU 201 collates the inputted contents with the stored four digits so as to judge if the printing is to be done. As described before, any special printer driver need not be installed in each computer system.

The detailed procedure of the printing operation is the same as in the case of Embodiment 1, and is implemented in accordance with the flowchart shown in FIG. 3. In this embodiment, steps 306–310 in the flowchart shown in FIG. 3 are the processing steps in the printer server 105.

First, the user sets and registers server and virtual printer names in the print setting screen. It is assumed here that the user sets and registers "netprn" as a server name, "sp2351" as a virtual printer name for security printing, and "pr1" as a virtual printer name for ordinary printing.

When the user starts the print process (step 301), he/she first determines a type of printing. That is, the user selects if the printing is the security printing (step 302). If the printing to be done is the security printing, the user selects "netprn" as the server name (printer server name) and "sp2351" as the printer name (virtual printer name) in the print setting screen (step 304).

For the ordinary printing, the user selects "netprn" as the server name (printer server name) and "pr1" as the printer name (virtual printer name) in the print setting screen (step 303).

The user may also set other printing conditions such as format etc., not shown. Subsequently, the user transmits a print instruction from the computer system 102 to the printer server 105 (step 305). The transmission is done using the LPR protocol. The print instruction contains print data, IP address of the computer system 102, user name, various setting information items, IP address of the destination printer server 105, and virtual printer name.

The printer server 105 receives the print instruction transmitted from the computer system 102 (step 306), and the CPU 201 recognizes the virtual printer name contained in the print instruction on the LAN protocol and judges if the designated virtual printer name is a virtual printer name for security printing (step 307). This judgment is done in the CPU 201 by referring to judging conditions stored in the RAM 202 or external memory 206. The security printing is judged when the virtual printer name is "sp****" while the ordinary printing is judged when the virtual printer name is "pr*", wherein "*" is a symbol representing any desired numeric character.

When the security printing is judged in step 307, the print data and associated information are temporarily stored in the external memory 206 or RAM 202 (step 308). At this time, the printer server 105 operates merely to store the print data and associated information without printing. In the printer server 105, the IP address and user name of the computer system 102 are also recognized when the print instruction is received (step 306). The IP address and user name are stored in the external memory 206 or RAM 202 in association with the print data.

When the printing is judged as not being the security printing (as being the ordinary printing) in step 307, the print data and associated information are transmitted from the printer controller 208 to the printer 106. In the printer 106, the print data is sent to the print unit 213 through the print unit interface 214 (step 311), and the print data is printed in the print unit 213 (step 312). Thus, the print process is ended (step 313). The printing in the ordinary printing mode proceeds in just the same manner as the conventional printing. That is, the printing in the ordinary printing mode is done without directly inputting the virtual printer name to the printer server 105. By the way, if an improper name has been inputted as the virtual printer name, the printer server 105 does not recognize the designated virtual printer either as the virtual printer for ordinary printing or as the virtual printer for security printing, in step 307. In that case, the printing operation with the printer server 105 results in a print error, and is, therefore, stopped.

If the printing is judged as the security printing in step 307 and the user of the computer system 102 (the user intending to execute the security printing) obtains printed matter, the print process proceeds as follows. First, the user goes to the front of the printer server 105, and operates the input operation unit 107 so that the names of users who have directed the security printing, stored in the RAM 202 or external memory 206, may be displayed on the display 108. Subsequently, the user operates the input operation unit 107 so as to select his/her own user name among the user names displayed on the display 108. Further, the user inputs the four hinder digits "2351" of the virtual printer name for security printing as selected in step 304, through the input operation unit 107 (step 309).

In the printer server 105, the virtual printer name for security printing "sp2351" is searched for from the stored information of the external memory 206 or RAM 202, on the basis of the user name selected through the input operation unit 107. The virtual printer name for security printing searched for is compared with the code "2351" inputted through the input operation unit 107, so as to judge if the four hinder digits agree (step 310).

If the judgment in step 310 is true, the printer server 105 transmits to the printer 106 the corresponding print data and associated information stored in step 308. In the printer 106, the print data and associated information are transmitted to the print unit 213 through the print unit interface 214 (step 311), and the printing is executed (step 312). The print data stored in the printer server 105 is deleted after completion of the printing, and the printing operation is ended (step 313).

In this way, the user wanting to execute the security printing can directly obtain the printed matter by operating the printer server 105. In the security printing, printing is not immediately executed even when the print instruction is given from the computer system, and it is not done unless the user goes to the front of the printer server 105 and directly operates the input operation unit 107. Accordingly, the user can avoid the situation that the printed contents are seen by another user sharing the printer 106, or that the printed matter is taken away. Moreover, the user can avoid the situation that any other user executes printing, by keeping the security printing virtual printer name secret from other users.

In this embodiment, any special printer driver need not be installed to implement the system. Further, in this embodiment, user registration in the printer is not required. Accordingly, an inexpensive and convenient security printing system can be implemented. Also, in this embodiment, since the setting of the security printing can be easily changed, it is possible to perform security printing by, for example, connecting a personal computer system carried in from the outside to the network.

While the present invention has been concretely described in conjunction with the embodiments thereof, it is not limited to the foregoing embodiments, and can be altered without departing from the spirit thereof.

Three computer systems and a single printer have been illustrated in FIG. 1. However, the number of computer systems is not limited to three, and it may be two or more than three. Also, the number of printers may be two or more. The printer may be an MFP having facsimile and copying functions. Further, the input operation unit of the printer may be externally mounted.

In the example shown in FIG. 4, a personal computer may be used as the printer server 105 in which a virtual printer name for security printing may be entered from a keyboard of the printer server. Also, the LAN may be a wireless LAN in addition to the wired LAN.

The computer systems need not be kept always connected to the LAN 101. By way of example, the user may carry in a notebook or mobile computer and connect it to the LAN 101 to thereby perform printing as indicated in Embodiment 1 or 2. In that case, if driver software for performing the LPR printing is installed in the notebook computer beforehand, no special setting is required in the connection of the computer to the LAN 101. Also, a personal digital assistant (PDA) or a cellular phone may be used as a terminal connected to the LAN.

The security printing according to the present invention may also be used within a particular group, in addition to the use by an individual. By way of example, assuming that two groups A and B share a single printer, the present invention can be utilized in printing a secret document which is to be distributed within only the group A. In that case, a virtual printer name for security printing to be shared within the group A is previously arranged and determined within the group A. If there is any printed matter which should be kept confidential within the group A, each user of the group A gives a print instruction to the printer or the printer server by designating that virtual printer name for security printing. Actual printing is performed when the user of the group A inputs the predetermined virtual printer name for security printing to the printer or the printer server. In this manner, by keeping the virtual printer name for security printing secret from the group B, only the users of the group A can obtain the printed matter.

It is also possible to set a plurality of virtual printer names for security printing in the present invention. Accordingly, the user may prepare a plurality of virtual printer names for security printing beforehand and dynamically select any of the printer names at the time of printing. The user may use a different virtual printer name for security printing for each printing. In addition, the print data may be held stored in the printer server 105 without being erased after the security printing. In that case, the user can directly obtain printed matter by directly operating the printer or printer server when he/she wants to print the print data. Such a function can be utilized when the same print data is printed repeatedly.

According to the present invention, a printing method with ensured security is provided which does not require any dedicated printer driver, can be implemented with reduced cost and trouble, does not separately require password registration in a printer, and simplifies setting procedures. Also, according to the present invention, a system and program for implementing the method are provided.

The invention claimed is:

1. A printing method comprising the steps of:
    receiving a print instruction which contains a virtual printer name;
    determining whether the virtual printer name is a virtual printer name for security printing by examining a first code part of the virtual printer name;
    storing print data without executing printing should the determination be that the virtual printer name is a virtual printer name for security printing;
    accepting the input of the virtual printer name, wherein a second code part of the virtual printer name includes a security code, for security printing to a printer; and
    printing the print data in response to said step of accepting the input.

2. A printing method according to claim 1, further comprising the step of printing said print data without inputting a printer name to a printer if the determination is that the virtual printer name is other than a virtual printer name for security printing.

3. Apparatus comprising:
    a printer which accepts a print instruction which contains a virtual printer name;
    a processor which determines whether the virtual printer name is a virtual printer name for security printing by examining a first code part of the virtual printer name;
    a memory in which print data is stored without executing the printing in the event it is determined that the virtual printer name is a virtual printer name for security printing;
    an input operation unit which accepts input of said virtual printer name, wherein a second code part of the virtual printer name includes a security code, for security printing to a printer; and
    a print unit interface which prints print data in response to such input.

4. A print system according to claim 3, further comprising a print unit interface which prints print data without input of a printer name to a printer in the event it is determined that the virtual printer name is other than a virtual printer name for security printing.

5. A computer-executable program which causes a computer to, implement the functions of:
    receiving a print instruction which contains a virtual printer name;
    judging if said virtual printer name is a virtual printer name for security printing by examining a first code part of the virtual printer name;
    storing print data without executing the printing if the judgment is true;
    accepting inputting of said virtual printer name, wherein a second code part of the virtual printer name includes a security code, for security printing to a printer; and
    printing said print data in response to said inputting.

* * * * *